Figure 1:
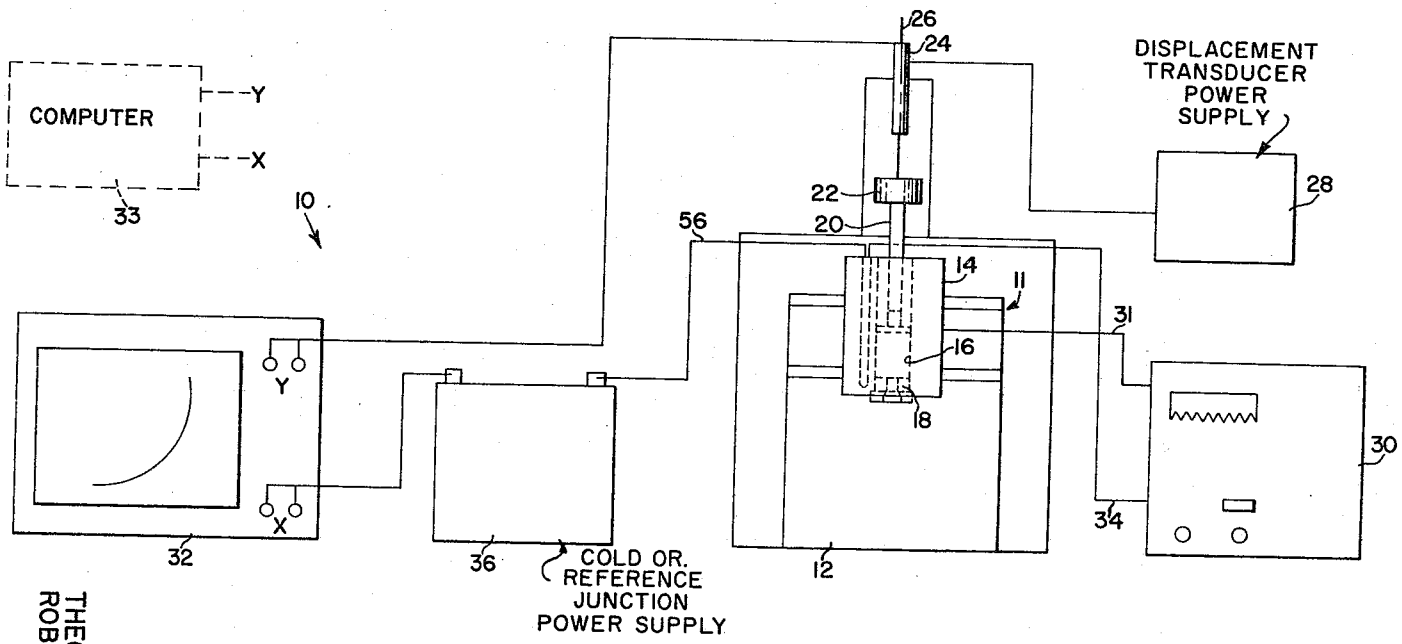
Figure 2A:
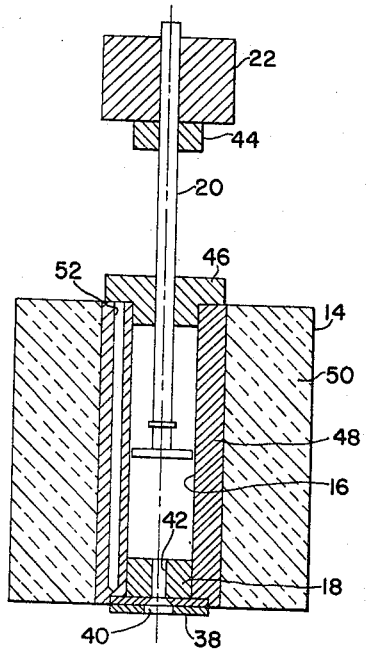
Figure 2B:
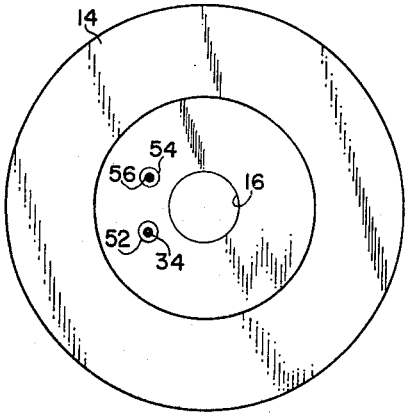
Figure 4:
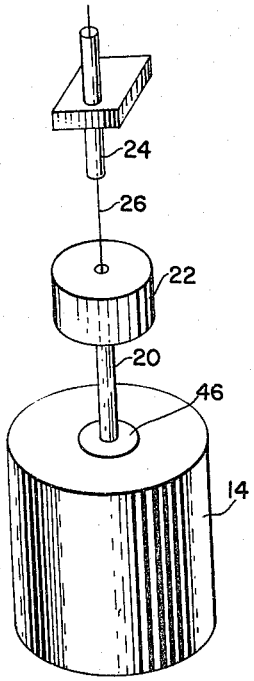
Figure 3:
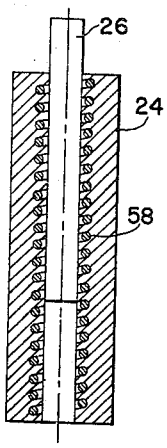
Figure 5:
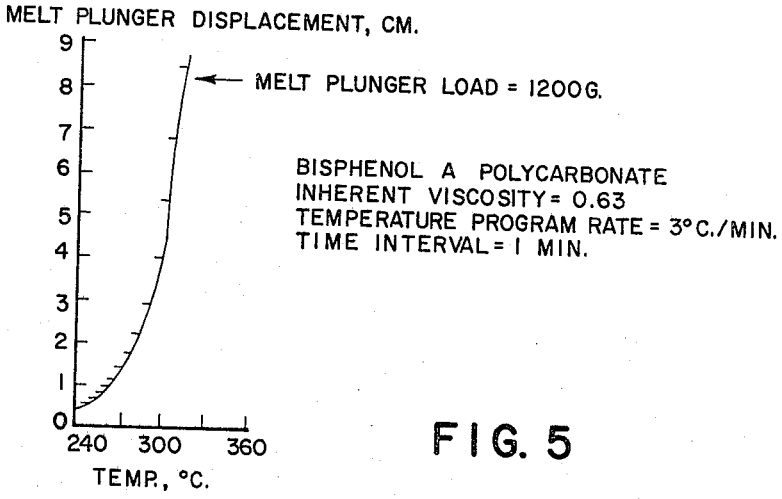
Figure 6:
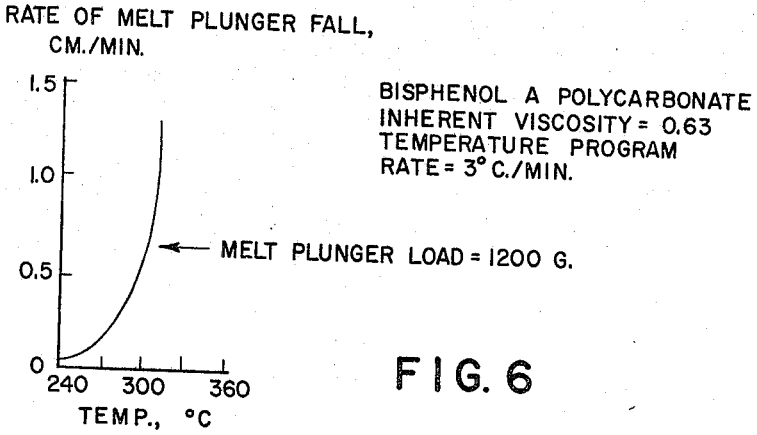
Figure 7:
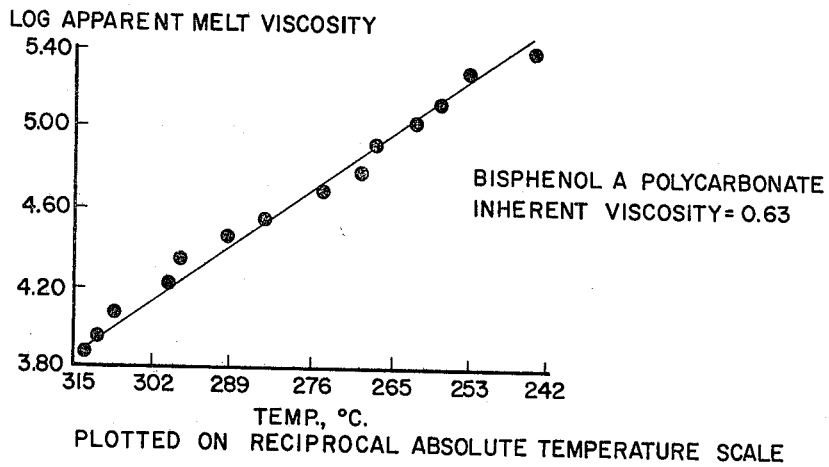
Figure 8:
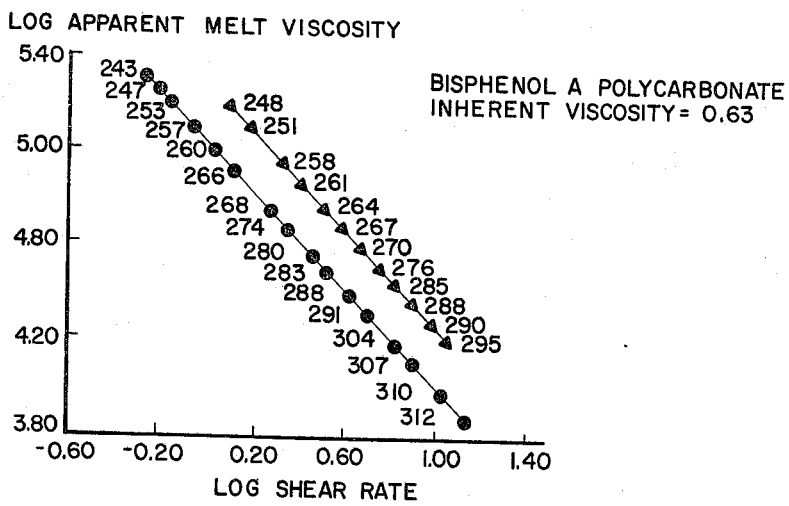
Figure 9:
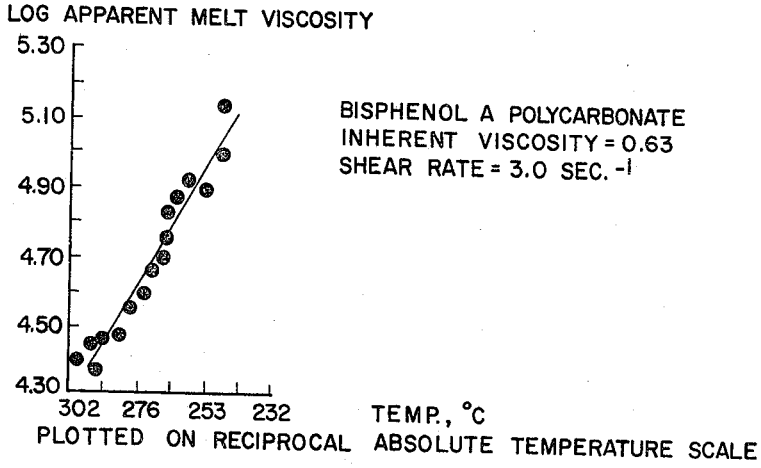
Figure 10:
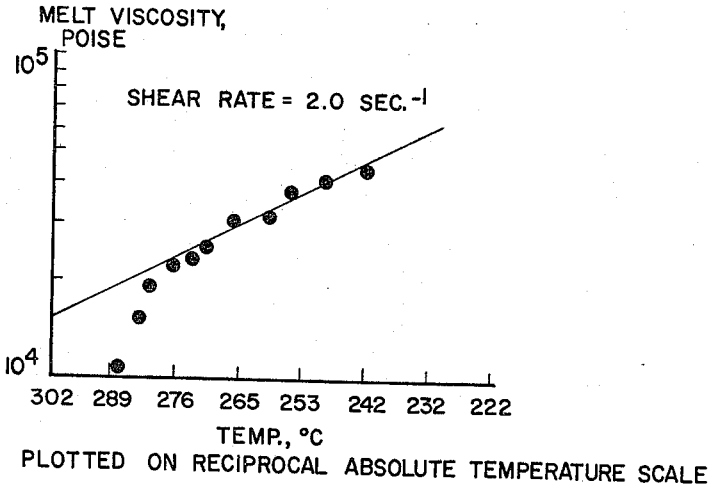
Figure 11:
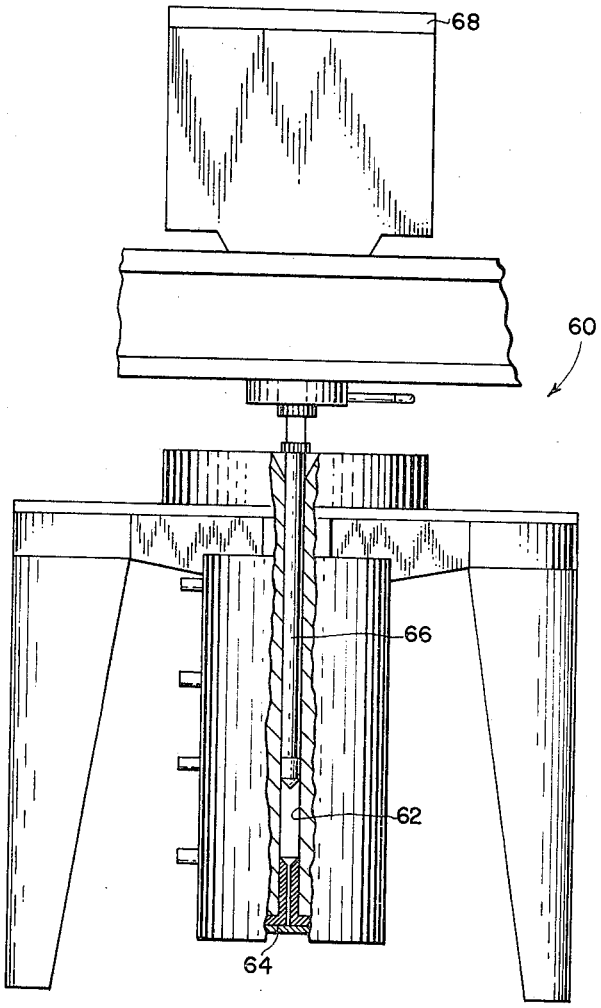

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 714

T869,014

APPARATUS AND IMPROVED METHOD FOR CONTINUOUSLY DETERMINING APPARENT MELT VISCOSITY OF A THERMOPLASTIC POLYMER

Theodore F. Gray, Jr., and Robert L. Combs, both of P.O. Box 511, Kingsport, Tenn. 37662

Continuation of application Ser. No. 729,287, May 15, 1968. This application July 30, 1969, Ser. No. 847,822

Int. Cl. G01n *11/04*

U.S. Cl. 73—56

6 Sheets Drawing. 21 Pages Specification

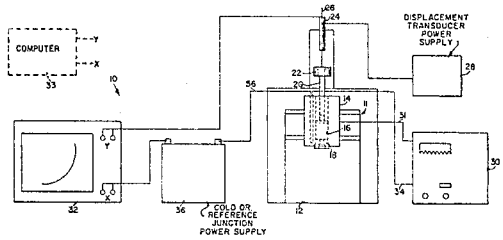

Apparatus and improved method for continuously determining apparent melt viscosity of a thermoplastic polymer sample wherein the temperature within an extrusion rheometer device is increased at a programmed rate and a transducer, such as a displacement transducer or a linear velocity transducer, continuously senses the displacement or the linear velocity rate of the piston of the rheometer device, and whereby an information receiving device correlates information on actual temperature of the polymer sample and the displacement or linear velocity rate of the piston.

Dec. 16, 1969 T. F. GRAY, JR., ET AL T869,014

APPARATUS AND IMPROVED METHOD FOR CONTINUOUSLY DETERMINING APPARENT MELT VISCOSITY OF A THERMOPLASTIC POLYMER

Original Filed May 15, 1968

6 Sheets-Sheet 1

THEODORE F. GRAY, JR.
ROBERT L. COMBS
INVENTORS

BY William T. French
Malcolm G. Dunn

ATTORNEYS

THEODORE F. GRAY, JR.
ROBERT L. COMBS
INVENTORS

BY William T. French
Malcolm H. Dunn
ATTORNEYS

THEODORE F. GRAY, JR.
ROBERT L. COMBS
INVENTORS

BY William T. French
Malcolm S. Dunn
ATTORNEYS

THEODORE F. GRAY, JR.
ROBERT L. COMBS
INVENTORS

BY William T. French
Malcolm J. Dunn

ATTORNEYS

THEODORE F. GRAY, JR.
ROBERT L. COMBS
INVENTORS

BY William T. French
Malcolm H. Dunn
ATTORNEYS

THEODORE F. GRAY, JR.
ROBERT L. COMBS
INVENTORS

BY William T. French
Malcolm H. Dunn

ATTORNEYS